(12) United States Patent
Pfeifer et al.

(10) Patent No.: US 6,739,812 B1
(45) Date of Patent: May 25, 2004

(54) REAR CARGO BARRIER SYSTEM

(75) Inventors: Jerome R. Pfeifer, Livonia, MI (US); Umran H. Ashrat, Troy, MI (US); Jeff L. Glaub, Sterling Heights, MI (US); Larry M. Storinsky, Rochester Hills, MI (US); Steven C. Strable, Rochester, MI (US); Martin S. Potok, Milford, MI (US); James A. Seidel, Metamora, MI (US); John M. Bederka, Sterling Heights, MI (US); Venkat S. Yanumula, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/310,501

(22) Filed: Dec. 5, 2002

(51) Int. Cl.⁷ .................................................. B60P 7/08
(52) U.S. Cl. ........................ 410/118; 410/117; 410/129; 296/24.43; 280/749
(58) Field of Search ................................ 410/117, 118, 410/121, 129, 97; 280/749; 296/42.33, 42.34, 24.43

(56) References Cited

U.S. PATENT DOCUMENTS

| | | | | | |
|---|---|---|---|---|---|
| 5,026,231 A | * | 6/1991 | Moore | ........................ | 410/118 |
| 5,090,856 A | * | 2/1992 | Moore | ........................ | 410/118 |
| 5,427,486 A | * | 6/1995 | Green | ........................ | 410/118 |
| 5,458,447 A | * | 10/1995 | Clason | ........................ | 410/100 |
| 5,702,143 A | * | 12/1997 | Shimazaki | | |
| 6,004,084 A | * | 12/1999 | Moker | ........................ | 410/118 |
| 6,345,944 B1 | * | 2/2002 | Florence | ..................... | 410/118 |
| 6,435,786 B1 | * | 8/2002 | Breckel et al. | ............. | 410/118 |
| 6,460,912 B2 | * | 10/2002 | Moore et al. | | |
| 6,554,339 B1 | * | 4/2003 | Moore | | |
| 6,557,926 B1 | * | 5/2003 | Bacher et al. | | |
| 6,616,389 B1 | * | 9/2003 | Ament et al. | ............... | 410/118 |
| 2002/0067047 A1 | * | 6/2002 | Seel et al. | | |

FOREIGN PATENT DOCUMENTS

GB 2229982 A * 10/1990 .............. 224/42.33

* cited by examiner

Primary Examiner—Stephen Gordon
(74) Attorney, Agent, or Firm—Donald J. Wallace

(57) ABSTRACT

A barrier system provides protection against rear cargo load intrusion into a passenger compartment of a vehicle. The barrier system is located in the rear cargo compartment of the vehicle. The barrier system includes a load bearing barrier net, a first set of attachments that connect the load bearing barrier net to a shelf panel in the rear cargo compartment and a second set of attachments that connect the load bearing barrier net to a wheel house in the rear cargo compartment. The first set of attachments is removable and the second set of attachments is not removable.

2 Claims, 1 Drawing Sheet

REAR CARGO BARRIER SYSTEM

FIELD OF THE INVENTION

The present invention relates to a barrier system that distributes intrusion loads.

BACKGROUND INFORMATION

Various safety systems may be found in vehicles to provide protection to the passengers of the vehicle. Such systems include air bags and seat belts. Other systems have yet to address protection against rear cargo load intrusion into the passenger compartment of the vehicle, which could jeopardize the safety of passengers in the vehicle.

SUMMARY OF THE INVENTION

The barrier system according to the present invention provides protection against rear cargo load intrusion into a passenger compartment of a vehicle. The barrier system is located in the rear cargo compartment of the vehicle. The barrier system includes a load bearing barrier net, a first set of attachments that connect the load bearing barrier net to a shelf panel in the rear cargo compartment and a second set of attachments that connect the load bearing barrier net to a wheel house in the rear cargo compartment. The first set of attachments may be removable and the second set of attachments may not be removable. The first set of attachments is connected to the shelf panel via a first set of brackets and the second set of attachments is connected to the wheel house via a second set of brackets.

DETAILED DESCRIPTION

Figure 1:
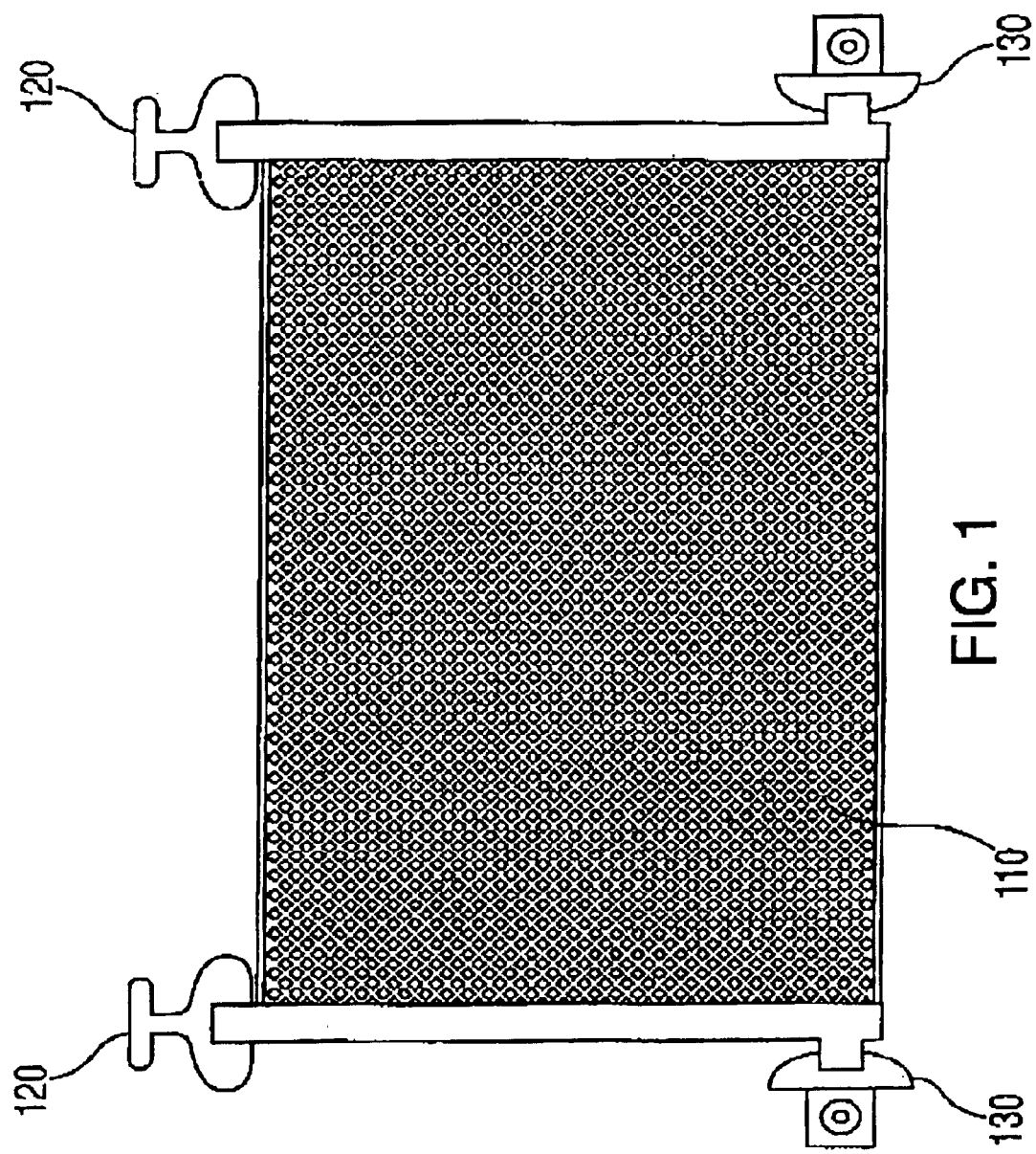
FIG. 1 shows an exemplary embodiment of the barrier system according to the present invention.

An exemplary embodiment of the barrier system according to the present invention is shown in FIG. 1. The barrier system provides protection against rear cargo load intrusion into a passenger compartment of a vehicle. The barrier system is located in the rear cargo compartment (not shown) of the vehicle, separating rear cargo from the passenger compartment of the vehicle. The barrier system includes a load bearing barrier net 110. A first set of attachments 120 is used to connect the load bearing barrier net 110 to a shelf panel (not shown) in the rear cargo compartment. The load bearing barrier net 110 is connected to the first set of attachments 120 at at least two upper regions of the load bearing barrier net. A second set of attachments 130 is used to connect the load bearing barrier net 110 to a wheel house (not shown) in the rear cargo compartment. The load bearing barrier net 110 is connected to the second set of attachments 130 at at least two lower regions of the load bearing barrier net 110.

In the exemplary embodiment, the first set of attachments 120 is removable and the second set of attachments 130 is not removable. Additionally, the load bearing barrier net 110 may be formed from a webbing material that is similar to the material used to form vehicle seat belts.

The first set of attachments 120 is removable and hence provide passenger access to the rear cargo in the rear cargo compartment from the passenger compartment. The first set of attachments 120 may include a clip that is attachable via a clamp and swivel. A threaded insert cavity may be used to connect the clamp and the swivel.

In the exemplary embodiment, the first set of attachments 120 is connected to the shelf panel via a first set of brackets (not shown) and the second set of attachments 130 is bolted to the wheel house via a second set of brackets (not shown).

What is claimed is:

1. A barrier system for a rear cargo compartment of a vehicle, comprising:

a load bearing barrier net;

a first set of attachments connected to at least two upper regions of the load bearing barrier net and configured to be connected to a shelf panel in the rear cargo compartment; and a second set of attachments connected to at least two lower regions of the load bearing barrier net and configured to be connected to a wheel house in the rear cargo compartment, wherein the load bearing barrier net provides protection against rear cargo load intrusion into a passenger compartment of the vehicle, and wherein the first set of attachments is connected to the shelf panel via a first set of brackets and the second set of attachments is connected to the wheel house via a second set of brackets.

2. A barrier system for a rear cargo compartment of a vehicle, comprising:

a load bearing barrier net;

a first set of attachments connected to at least two upper regions of the load bearing barrier net and configured to be connected to a shelf panel in the rear cargo compartment; and a second set of attachments connected to at leas two lower regions of the load bearing barrier net and configured to be connected to a wheel house in the rear cargo compartment, wherein the bearing barrier net provides protection against rear cargo load intrusion into a passenger compartment of the vehicle, and wherein the second set of attachments is bolted onto the wheel house.

* * * * *

UNITED STATES PATENT AND TRADEMARK OFFICE
CERTIFICATE OF CORRECTION

PATENT NO. : 6,739,812 B1
DATED : May 25, 2004
INVENTOR(S) : Pfeifer et al.

It is certified that error appears in the above-identified patent and that said Letters Patent is hereby corrected as shown below:

<u>Title page</u>,
Item [75], Inventors, "Umran H. Ashrat, Troy, MI (US)" should be
-- Umran H. Ashraf, Troy, MI (US) --

Signed and Sealed this

Thirtieth Day of November, 2004

JON W. DUDAS
*Director of the United States Patent and Trademark Office*